Figure 1:
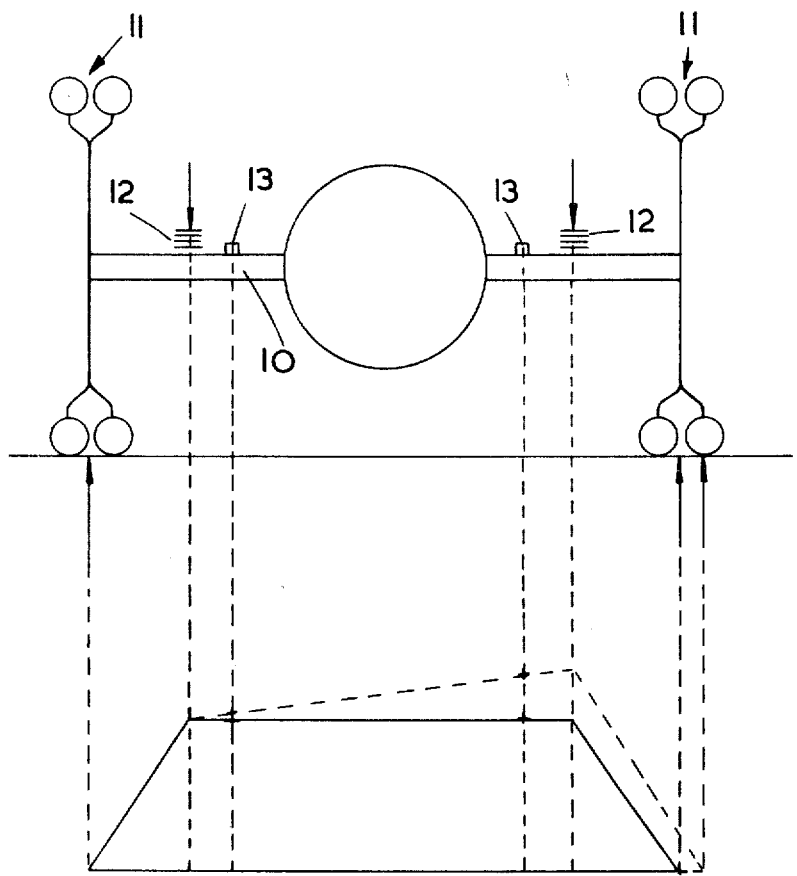

United States Patent [19]
Scott et al.

[11] 3,889,767
[45] June 17, 1975

[54] WEIGHING DEVICES

[75] Inventors: Kenneth C. Scott, London; Alec Harry Seilly, Wembley, both of England

[73] Assignee: Simms Group Research & Development Limited, London, England

[22] Filed: Mar. 18, 1974

[21] Appl. No.: 452,072

[30] Foreign Application Priority Data
Mar. 20, 1973 United Kingdom............... 13186/73

[52] U.S. Cl................................. 177/136; 177/211
[51] Int. Cl............................................. G01g 19/08
[58] Field of Search ........................... 177/136–137; 73/141 A, 141 R

[56] References Cited
UNITED STATES PATENTS

| | | | |
|---|---|---|---|
| 3,172,492 | 3/1965 | Sobotka | 177/136 |
| 3,443,652 | 5/1969 | Videon | 177/136 |
| 3,580,343 | 5/1971 | Hogue | 177/136 |
| 3,650,340 | 3/1972 | Bradley | 177/136 |
| 3,743,041 | 7/1973 | Videon | 177/136 |
| 3,800,895 | 4/1974 | Gale | 177/136 |

*Primary Examiner*—Joseph W. Hartary
*Assistant Examiner*—Vit W. Miska
*Attorney, Agent, or Firm*—Kane, Dalsimer, Kane, Sullivan and Kurucz

[57] ABSTRACT

A weighing device for attachment to and for providing an indication of the load applied to a vehicle axle to which the load is applied at a pair of spaced points comprises two pairs of sensing means, the sensing means of one pair being mounted on opposite sides of one of said points, each of said sensing means providing an electrical signal indicative of the bending moment at its particular position, and the device including electrical circuit means for processing the signals produced by the sensing means to provide an indication of the total load applied to the axle.

4 Claims, 3 Drawing Figures

WEIGHING DEVICES

This invention relates to weighing devices for attachment to and for providing an indication of the load applied to a vehicle axle, the axle being of the kind to which the load is applied at a pair of spaced points thereof, from the body of the vehicle.

It is possible to provide a pair of sensing means which can be attached to the axle of the vehicle at positions at or spaced from the aforesaid points respectively, said sensing means providing signals indicative of the bending moment in the axle at said positions. From these signals it is possible to determine the total load applied to the axle. This arrangement is perfectly satisfactory for varying loads if the spacing of the points of application of the load relative to the points of support of the axle remain constant. If, however, the point or points of support vary, then the calibration of the device is upset since the bending moment in the axle varies even if the total load remains contstant.

Such an occurrence can occur for instance in an axle which carries at its opposite ends respectively two pairs of road wheels. In normal conditions, it can be said that the point of support lies between the wheels of a pair of wheels, but in the event that one of the wheels is worn or lodging on a brick, then the point of support will effectively be to one side or the other of the theoretical position.

The object of the present invention is to provide a weighing device for the purpose specified in a simple and convenient form.

According to the invention a weighing device for the purpose specified comprises two pairs of sensing means for mounting on the axle, the sensing means of one pair being positioned on opposite sides of one of said points, and the sensing means of the other pair being positioned on opposite sides of the other of said points, each of said sensing means providing an electrical signal indicative of the bending moment at its particular position, and electrical circuit means for processing said signals to provide an indication of the total load applied to the axle.

Figure 3:
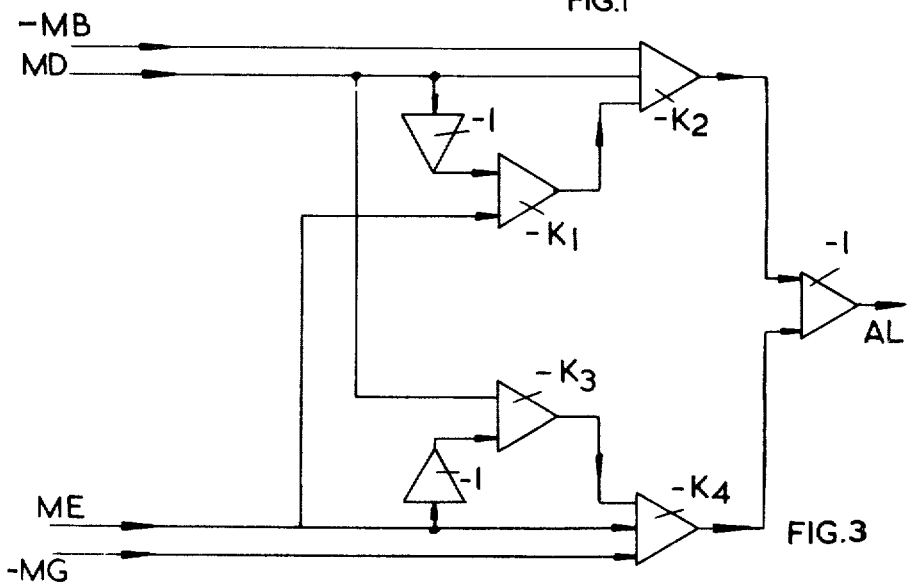
Figure 2:
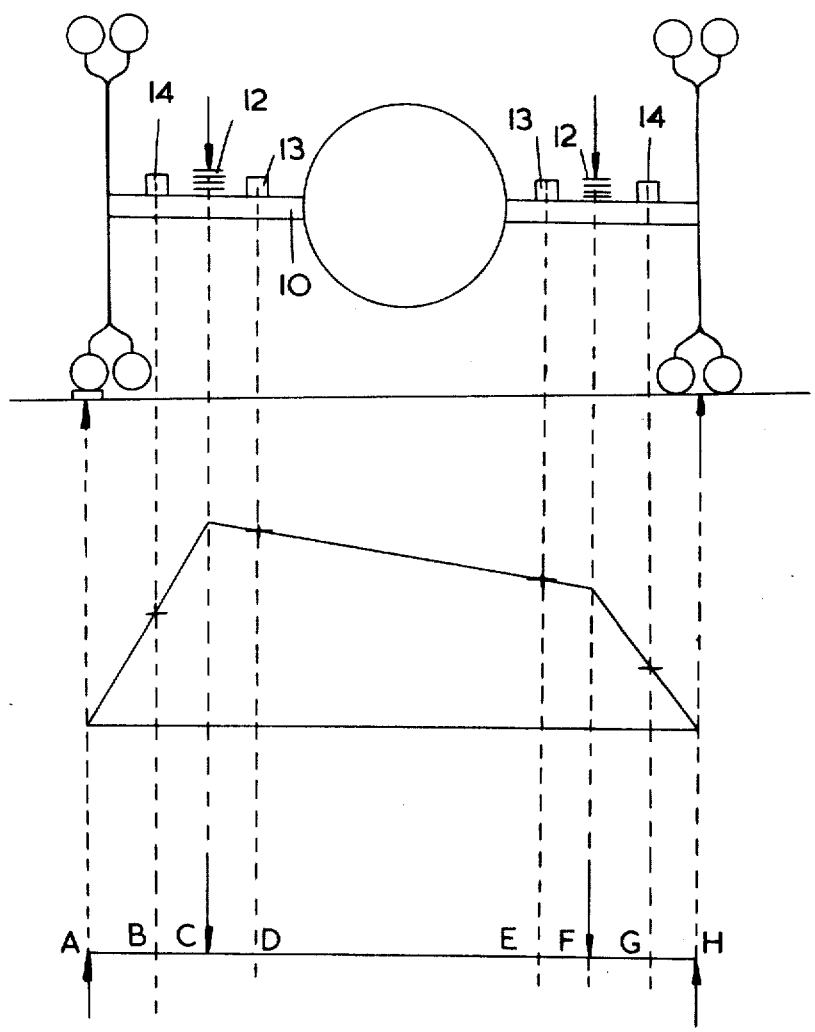

In the accompanying drawings:

FIG. 1 shows a known form of weighing device for attachment to a vehicle, together with the bending moment diagram, FIG. 2 illustrates a weighing device in accordance with the invention, also showing the bending moment diagram, and FIG. 3 shows an electrical circuit arrangement to which signals are applied from the sensing means shown in FIG. 2.

With reference to FIG. 1 of the drawings, there is provided an axle 10 conveniently of tubular construction and which mounts at its ends respectively, two pairs of road wheels 11, the wheels of each pair of road wheels being disposed in side by side relationship.

At positions disposed inwardly on the road wheels, the axle carries springs 12 to which the body of the vehicle is attached and through which the load constituted by the weight of the body of the vehicle together with any articles carried thereby, is transmitted to the axle.

Also shown in FIG. 1 is a bending moment diagram for the axle. The bending moment diagram which is in continuous line assumes that the effective point of support of the vehicle axle lies midway between the wheels of each pair of wheels, and it will be seen that bending moment diagram is symmetrical. The bending moment diagram which is illustrated in dotted outline shows the situation which arises when the outer wheel of the right hand pair is positioned on a brick so that the point of support has effectively moved outwardly by a predetermined amount. It will be seen that the bending moment diagram is no longer symmetrical even though the same load is applied.

Referring again to FIG. 1, it will be seen that at positions spaced inwardly of the springs 12, there is located a pair of sensing means 13 conveniently comprising electrical strain gauges. The signals provided by the strain gauges represent the bending moment in the axle at the positions of the gauges, and when the axle is correctly supported and the load is uniform, the signals will be equal and can be utilised to ascertain the total load applied to the axle. Even if the loading should vary, the signals can still be processed to provide an indication of the total loading. When the point of support alters however, the calibration of the device is upset, and whilst a reason for movement of the effective point of support has been given as a brick under one of the wheels, it will be appreciated that similar conditions can arise if one of the wheels of a pair is worn, or alternatively inflated to an incorrect pressure.

In the arrangement shown in FIG. 2, the axle is shown in the position it would take in the event that a brick is disposed under the outer wheel of the left hand pair of wheels. In addition, this Figure illustrates the provision of a further pair of sensing means 14, disposed outwardly of the springs 12. The bending moment diagram is again drawn for an equal load applied through the springs 12, and it will be seen that the sensing means 13 and 14 will provide signals indicative of the bending moments indicated with crosses on the bending moment diagram.

It can be shown that the total applied load $$A1 = K_2[Md + K_1(Md - Me) - Mb] + K_4[Me - K_3(Md - Me) - Mg]$$

where
$K_1 = Xcd/Xde$
$K_2 = 1/Xbc$
$K_3 = Xer/Xdf$
$K_4 = 1/Xfg$

In the above, $M$ is the bending moment at the point indicated by the suffix letter, and $X$ is a distance between the points indicated by the suffix letters.

FIG. 3 illustrates an analogue circuit diagram in which the signals from the sensing means are processed. It will be seen that the signals from the sensing means 14 are supplied to the circuit in inverted form, and that the circuit includes a number of function generators whose function is indicated by the symbol thereon. The output is indicative of the total applied loading on the axle. It will further be noted that the equation of the total applied load does not include any terms which vary as a function of the movement of the point of support. The equation therefore holds true whatever the point of support.

We claim:

1. A weighing device for attachment to and for providing an indication of the load applied to a vehicle axle to which the load is applied at a pair of spaced points, the device comprising two pairs of sensing means for mounting on the axle, the sensing means of one pair being positioned on opposite sides of one of said points, and the sensing means of the other pair being positioned on opposite sides of the other of said points, each of said sensing means providing an electrical signal indicative of the bending moment at its particular position, and electrical circuit means for processing said signals to provide an indication of the total load applied to the axle.

2. A weighing device as claimed in claim 1 in which said electrical circuit means is an analogue circuit.

3. A weighing device for attachment to and for providing an indication of the load applied to a vehicle axle to which the load is applied at a pair of spaced points intermediate the ends of the axle, the device comprising two pairs of sensing means for mounting on the axle, one pair of sensing means being adapted to be mounted on the axle with one of said points located between the two sensing means of the one pair, the other pair of sensing means being adapted to be mounted on the axle spaced from the first pair and having the other of said points located between the two sensing means of the other pair, each of said sensing means providing an electrical signal indicative of the bending moment at its particular position, and electrical circuit means for processing said signals to provide an indication of the total load applied to the axle substantially independent of the position of the axle with respect to the horizontal.

4. The invention in accordance with claim 3 in which said electrical circuit means is an analogue circuit wherein signals from the sensing means are supplied to the circuit in inverted form, the circuit including a number of function generators arranged to perform interrelated functions to produce an output indicative of the total applied loading on the axle independent of the movement of the points of support.

* * * * *